May 21, 1935.  I. C. BUCKMINSTER  2,001,814
ARTICLE TRANSFERRING MECHANISM
Original Filed Dec. 10, 1930  4 Sheets-Sheet 4

INVENTOR
Ira C. Buckminster
By his Attorney
Harlow M. Davis

Patented May 21, 1935

2,001,814

UNITED STATES PATENT OFFICE 2,001,814

ARTICLE TRANSFERRING MECHANISM

Ira C. Buckminster, Beverly, Mass., assignor to United Shoe Machinery Corporation, Paterson, N. J., a corporation of New Jersey Original application December 10, 1930, Serial No. 501,345. Divided and this application July 7, 1933, Serial No. 679,409

22 Claims. (Cl. 29—60)

This invention relates to article transferring mechanism and is herein illustrated as embodied in mechanism for transferring metallic plugs in a machine for operating upon lasts, which is fully disclosed in an application for Letters Patent Serial No. 501,345, filed December 10, 1930, (now Letters Patent No. 1,938,689, dated December 12, 1933), of which the present application is a division.

The particular machine disclosed in said parent application is designed to form a plurality of positioning holes extending from the bottom face of a last and to insert metallic plugs in the respective holes, thus preparing the last for use, for example, in the practice of a method of lasting the toes of shoes more fully explained in Letters Patent Nos. 1,674,060 and 1,723,301, Pym.

As herein illustrated, the present invention provides automatic means for controlling the delivery of plugs from a hopper to one or more raceways from which the plugs are transferred to tools, which may be the tools of a machine of the type referred to, by which the plugs are inserted in holes previously drilled in the bottom of the last.

More specifically, the illustrated mechanism comprises a hopper into which a mass of metallic plugs, each approximately cylindrical in shape but with one end frusto-conical, may be dumped, the hopper being moved by one or more cranks rotating in a substantially horizontal plane to agitate the articles and effect their delivery from the hopper through one or more exit passages. Preferably, a flexible guideway, provided by two springs, extends between each exit passage of the movable hopper and the upper end of a stationary raceway.

According to a feature of the invention, the feeding or delivery of articles from the hopper to each raceway is controlled by a movable finger arranged in one position to engage articles in the raceway and cooperating with a stop movable by said finger into the path of said articles for interrupting their delivery to the raceway. A further feature of the invention relates to novel mechanism for transferring the plugs from a table at the lower end of each raceway to an inserting tool and, as herein illustrated, that mechanism comprises a picker, a carrier for said picker and automatic means for moving said carrier both about an axis and axially to cause the picker to grasp an article resting on said table and move it therefrom to another position. Preferably an ejector is mounted on the carrier, and novel means controlled by the movement of the carrier effects ejecting and retracting movements of the ejector.

While the present invention, as herein illustrated by way of example, is embodied in mechanism for transferring plugs to be inserted in lasts, it will be understood that this mechanism is adapted, with or without obvious changes in form, for use in transferring other articles to be used for other purposes.

Furthermore, the invention comprises various other combinations and arrangements of parts as well as particular features of construction which will now be described in detail in connection with the accompanying drawings which illustrate a preferred embodiment of the invention and in which the respective parts are designated generally by the same reference numerals as have been employed to designate the same parts in the said parent application.

As fully disclosed in said parent application, Serial No. 501,345, the illustrated machine drills three holes to a predetermined depth in the bottom of a last L and then solid metallic plugs P are forced home into the holes.

Figure 1:
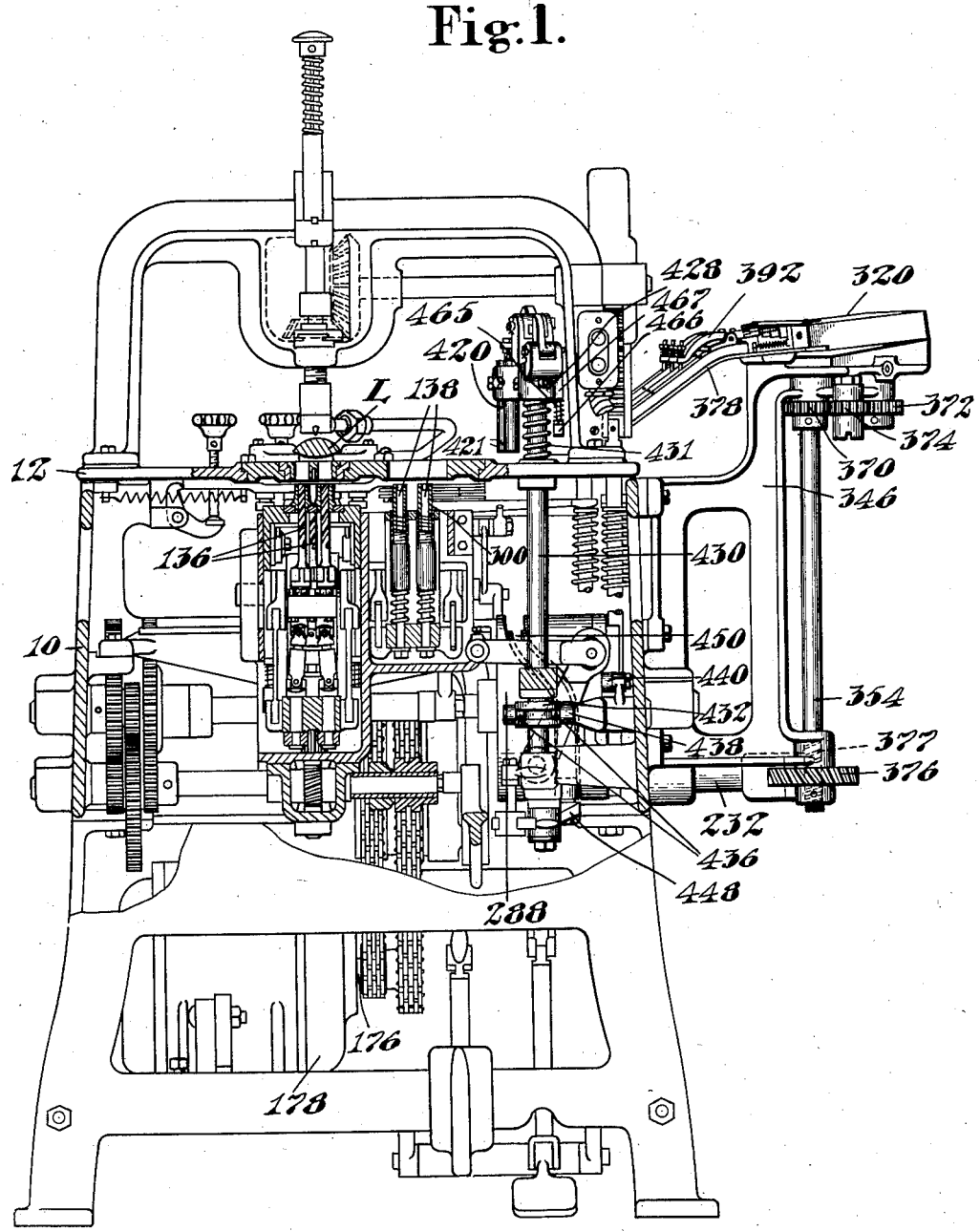
Fig. 1 is a front elevation of substantially a complete machine for operating on lasts to which the plug transferring mechanism of the present application is applied, the parts of the machine which particularly relate to said mechanism being shown with shade or heavy boundary lines.
Figure 2:
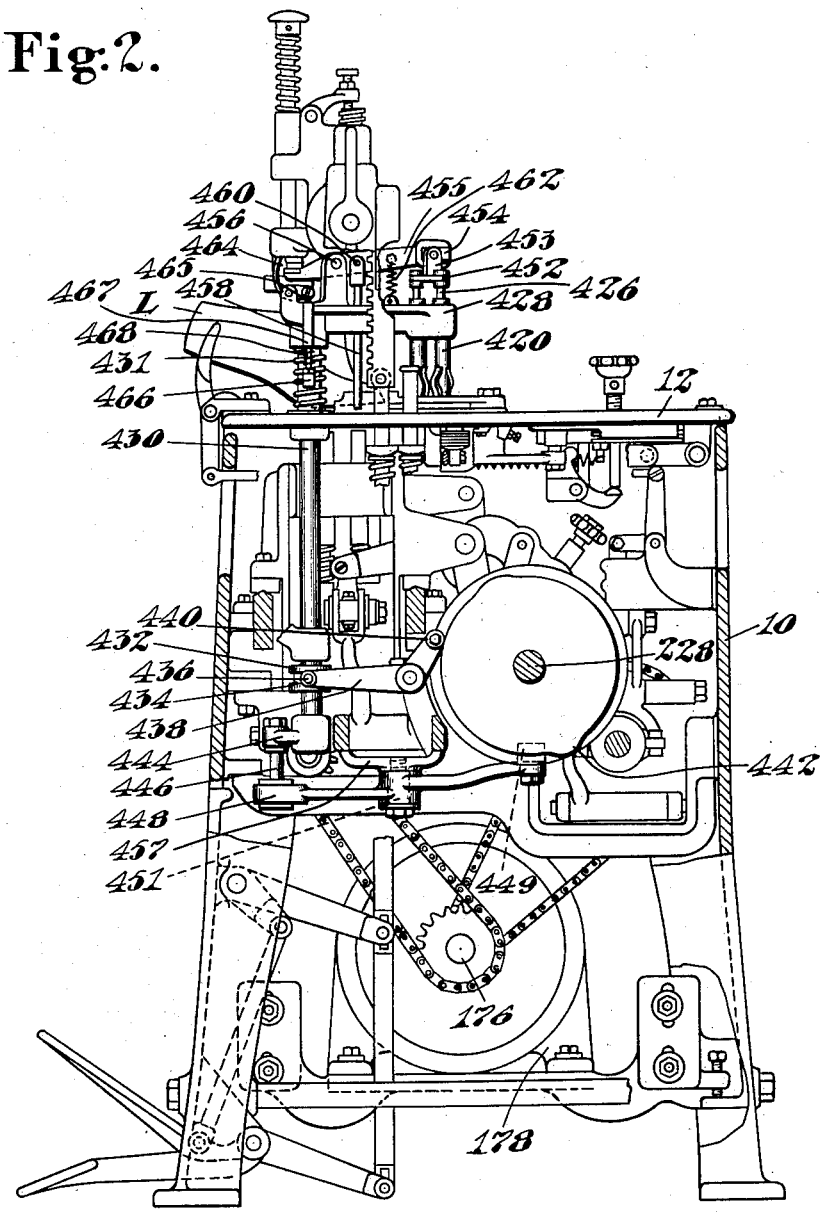
Fig. 2 is a side elevation of the machine.

As illustrated in Figs. 1 and 2, the machine includes a main frame 10 to the top of which is bolted a table 12 which carries various parts including last positioning and clamping devices. The drills 136 are rotated rapidly to bore three parallel holes extending from the bottom face of the last L at a predetermined angle, i. e. substantially a right angle, to the general plane of the forepart of the bottom of the last and then three plugs P are forced by inserting tools 138 to the bottoms of the holes so bored.

Figure 7:
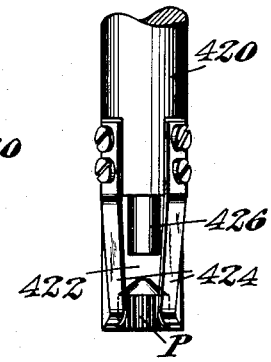
Fig. 7 is a detail view on a still larger scale of one of the plug transferring devices.
Figure 6:
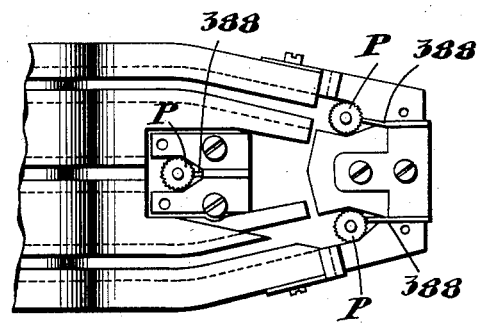
Fig. 6 is a plan view on a larger scale of the lower ends of the raceways.

The mechanism, to which the present invention particularly relates (herein referred to generally as transferring mechanism), comprises means for agitating, assorting, feeding and transferring plugs P automatically from a hopper 320 to the inserting tools 138. As illustrated, a mass of the plugs may be dumped into the open top hopper 320 supported with its bottom 322 at an inclination to the horizontal. To facilitate the passage of the plugs through the three exit ports 324 and between vertical guide flanges 326 of the hopper, two ribs or wires 328, 330 are fixed on its bottom and two partitions 332, 334 are arranged in the lower corners and a stationary bar 336 has an end 337 extending downwardly not quite to the tops of the ribs into position to engage the plugs. The ports 324 are of such shape that the plugs P can pass through them only when they are upright, i. e. when their frustoconical ends are uppermost, as shown in Figs. 6 and 7. The particular illustrated arrangement of the ribs 332, 334 and end 337 of bar 336 has been found by experiment to be very effective for arranging the plugs in such upright position and for ensuring the delivery of an adequate number of plugs through the ports.

Figure 3:
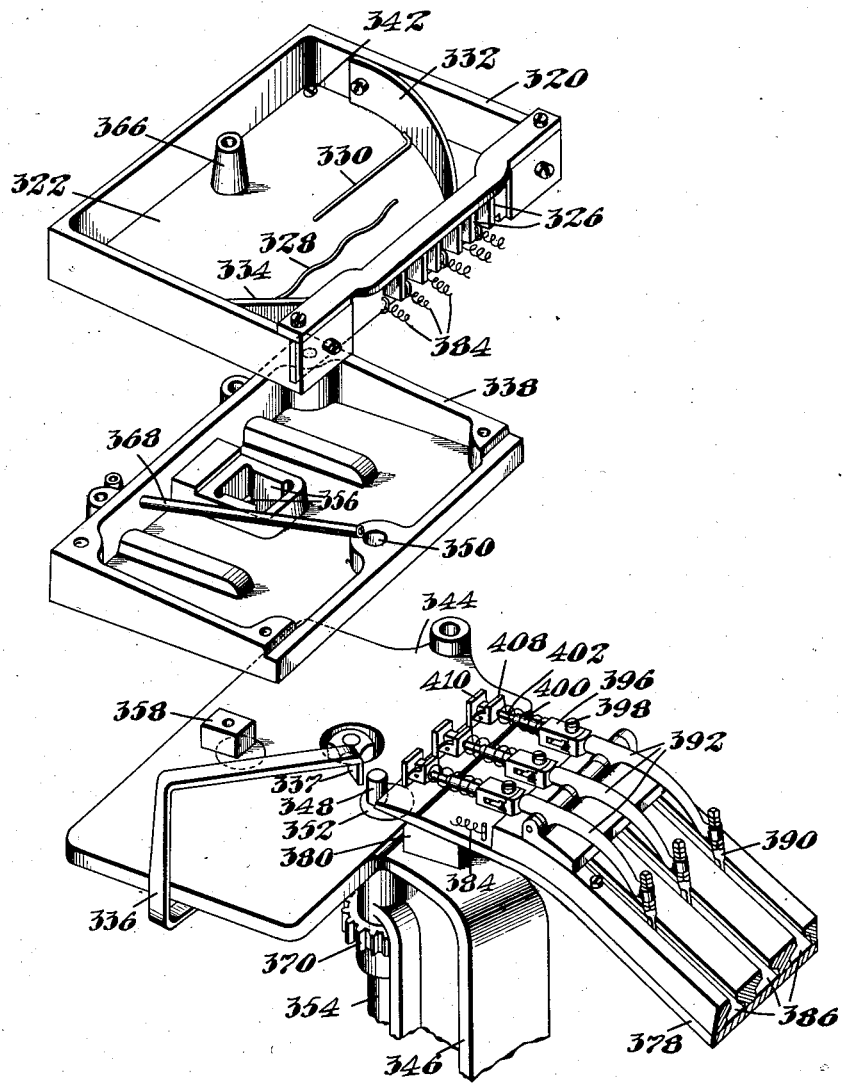
Fig. 3 is an exploded view in perspective of parts of the plug agitating and feeding devices.
Figure 5:
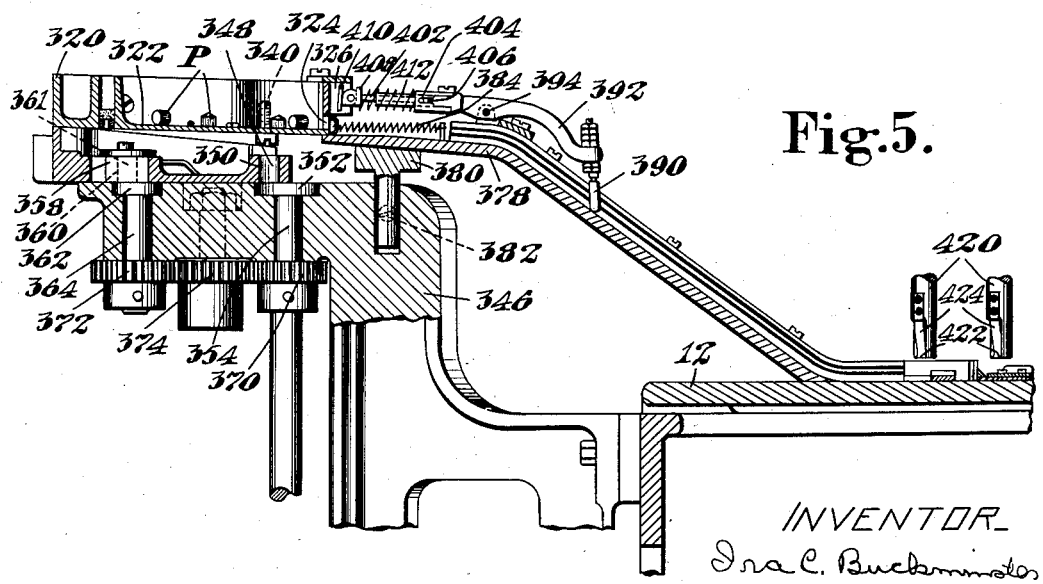
Fig. 5 is a sectional elevation of parts shown in Figs. 3 and 4.

The hopper 320 is supported directly on a frame or open box 338 (Fig. 3) but preferably adjusting means, such as screws 340, one of which is shown in Fig. 5, is provided for varying the height of the front end of the hopper, thus varying the angle of the inclination of its bottom 322. The hopper is secured to the frame 338 in any suitable manner as by screws, such as 342 (Fig. 3). The frame 338 is supported on and slidable over a flat surface 344 formed on a part of a bracket 346 extending from the main frame of the machine. A rapid circular motion, approximately in a horizontal plane, is imparted to the frame 338, and the hopper 320 carried thereby, by mechanism which includes a crank pin 348 rotatable in a journal 350 in the frame 338, the crank pin being formed on a disk 352 at the upper end of a vertical shaft 354. The frame 338 is provided also with bearing surfaces 356 along which may slide a block 358 having a hole 360 (Fig. 5) therein fitting another crank pin 361 on a disk 362 forming a part of a second vertical shaft 364. The two cranks may be of the same or somewhat different lengths or eccentricities. The drawings show various devices such as boss 366 and pipe 368 (Fig. 3) having passages for conducting oil to parts to be lubricated. The block 358 fitting between surfaces 356 is provided to ensure a smooth and quiet operation of the hopper agitating mechanism and to make it unnecessary, in manufacturing the parts, to have the two crank pins 348, 360 a precise distance apart. Each of the two vertical shafts 354, 364 carries a spur gear 370, 372 between which is an intermediate gear 374 (Fig. 5). The shaft 354 to which the gear 370 is secured carries near its lower end (Fig. 1) a spiral gear 376 which is driven by a similar gear 377 on a shaft 232 which is driven through appropriate connections, as set forth in said parent application, from the rotor shaft 176 of an electric motor 178.

The plugs P which pass through the ports 324 and between flanges 326 enter three race ways formed in part by a bottom plate 378 (Figs. 3 and 5), the upper end of which bears at its upper side against the under side of the bottom 322 of the hopper 320 and is supported by an adjustable post 380 which is secured by a set screw 382 in adjusted position in the bracket 346, the lower end of the plate 378 resting upon the table 12. Inasmuch as this plate 378 is stationary while the hopper moves, a flexible connection is provided between the two including a coiled spring 384 at each side of each port 324, one end of each spring being connected to the hopper and the other to the plate close to the entrance to one of three slots 386 which provide raceways to guide the plugs to the table 12 upon which, at the exit end of these slots, are stops in the form of ribs 388 which position the lowermost of the plugs, coming from the three slots, on the table in the relation shown particularly in Fig. 6.

For controlling automatically the delivery of the plugs through the ports 324 there is provided for each raceway and slot 386 a mechanism including a finger or feeler 390 adjustably mounted at the lower end of a lever 392 pivoted on the raceway plate 378 at 394 and carrying at its upper end a block 396 which is constructed for limited lateral movement relative to the forward part of the lever 392 being connected to said forward part by a vertical pivot 398. Extending rearwardly from the block 396 and rigid therewith is a sleeve 400 and within this sleeve is slidably mounted a rod 402 carrying at its rear end a cross pin 404 slidable in a slot 406 in the block. To the rod at its rear end is pivoted another block 408 having a gate at its rear end in the form of a plate 410 of a size to close the corresponding port 324. A coiled spring 412 tends constantly to maintain the block 408 at its maximum distance from block 396, the movement of the block 408 about its pivot being limited by the flanges 326 at the sides of ports 324.

Normally the three plug-controlling devices just described occupy the positions shown in Fig. 5 so that the plugs P may travel freely down the raceways and as any one encounters a feeler 390 it passes thereunder tilting the lever 392 about its pivot and moving the plate 410 into position to close the corresponding port 324. However, if the raceway below a particular feeler has not been filled that feeler will return to its normal position shown in Fig. 5 as soon as the plug has passed. If, however, the raceway below the feeler has been filled the next plug will remain beneath the feeler and prevent it and its connected parts from returning to their normal positions and, therefore, the plate 410 will close the corresponding port and keep it closed until the plug then under the feeler has been permitted, by the downward movement of the preceding plugs, to move further down the raceway after which the feeler will resume its normal position allowing more plugs to pass through the port.

Figure 4:
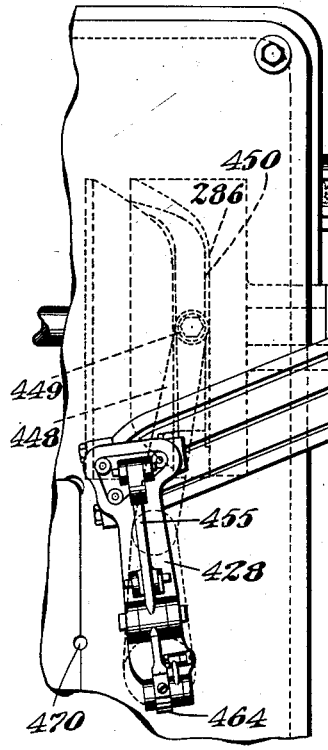
Fig. 4 is a plan view of the same devices and of the adjacent portion of the machine.

The mechanism for transferring the plugs from the position indicated in Fig. 6 to the inserting tools 138 comprises three pickers or plungers in the form of rods 420 slotted at their lower ends at 421 (Fig. 1) to clear ribs 388, each rod being cut away to form a flat surface, as indicated at 422 (Figs. 5 and 7), and having two spring fingers 424 so mounted on the rod 420 that the area between the lower ends of the fingers and the surface 422 of each rod is somewhat less than the area of a plug in cross section and the lower ends of the fingers are outturned so that, when a rod is moved vertically down from a position immediately above a plug, the fingers yield and the end of the rod passes over the plug, the fingers retaining the plug clamped laterally against each surface 422, but the plug may be ejected from the picker by an ejector rod 426. The three rods 420 are adjustably and removably secured to the rear end of a swinging arm 428 (Figs. 1, 2 and 4) rigidly secured to a vertical rod 430 supported in the frame for both axial and rotary movement. A spring 431 normally holds this rod and its connected parts in a position in which the lower ends of the rods 420 will be at a height above the table somewhat exceeding the height of the plugs P. For depressing the rod against the resistance of this spring, a collar 432 is secured to the rod and is provided with a groove 434 which receives a pair of studs 436 at the forward end of a bifurcated lever 438 pivoted in the frame and carrying a cam roll 440 bearing against a cam 442 fixed to a cam 288 (Fig. 1) loose on a shaft 228 and driven from the motor 178 through appropriate connections, as set forth in said parent application. For oscillating the rod 430, an arm 444 is secured at its lower end and has secured at its outer end a vertical pin 446 which has a sliding fit in the outer end of a lever 448 which at its opposite end carries a cam roll 449 running in a cam groove 450 in cam 288. Lever 448 is pivoted at 451 on a bracket 457 secured to the machine frame. As shown in Figs. 1 and 4, the cam groove 450 is formed at the bottom of another cam groove 286, i. e. nearer the axis of cam 288.

The three ejector rods 426 are connected at their upper ends to a horizontal plate 452 (Fig. 2) connected by a link 453 pivoted to a block 454 slidable in a slot in the rear end of a lever 455 pivoted at 456 to lugs extending upward from the arm 428. This lever 455 is raised to retract the ejectors 426 by a rod 458 pivoted thereto at 460 which in turn is lifted when the lower end of the rod comes into contact with the table 12. A coiled tension spring 462 tends constantly to move the rear end of lever 455 downwardly but, when it has been moved in the opposite direction against the resistance of this spring, it is held so as to leave the ejectors withdrawn, i. e. at their highest position, by latch lever 464 to which is connected a rod 465 sliding through a sleeve 467 forming a part of arm 428. A coiled spring 468 between the lower end of said sleeve and an enlarged lower end 466 of said rod tends normally to hold the latch in operative position but, when the lower end 466 comes into contact with the table 12, the latch is released and spring 462 becomes effective to move the ejectors 426 to their lowermost position.

The cams and the other parts just described are so constructed and arranged that the pickers 420, through the rotation of rod 430, are moved into a position, as shown in Figs. 1 and 5, immediately above the plugs P and then the rod 430 is depressed and the plugs P are clamped, as shown in Fig. 7, after which the pickers are raised and the rod 430 is rotated to carry the pickers and the plugs carried thereby to position immediately over the inserting tools 138. The rod 430 is again depressed to place the plugs close to and axially in alignment with the tools 138, the lower end of rod 458 at that time passing through a clearance hole 470 (Fig. 4) in table 12, and the latch 464 is released so that the ejectors 426 push the plugs out of the pickers and deposit them on the inserting tools 138 and within sleeves 300 which surround those tools after which the pickers are again raised and turned to inoperative position ready for a repetition of the series of movements just described.

Having thus described my invention what I claim as new and desire to secure by Letters Patent of the United tSates is:

1. Article transferring mechanism having, in combination, a hopper arranged with its bottom inclined to the horizontal and having an exit passage in its lower wall, two separated, low cross-ribs on said bottom with their ends overlapping a line extending downward along the bottom to said passage, a stationary finger extending to a point above the said bottom and between said ribs and said passage, a normally stationary raceway, a yielding guideway between said passage and said raceway, a frame to which the hopper is secured with means having provision for adjustment to vary the angle of inclination of said bottom, a stationary, flat support on which the frame is slidable, two cranks connected to the frame and movable about parallel, vertical axes, the connections for one crank including a sliding block, and driving mechanism for rotating said cranks to effect delivery of articles from said hopper through said passage to said raceway.

2. Article transferring mechanism having, in combination, a hopper having an exit passage and having its bottom inclined to the horizontal, two cranks connected to the hopper and movable about parallel axes, the connections for one crank including a sliding block, and driving mechanism for rotating said cranks to effect delivery of articles through said passage.

3. Article transferring mechanism having, in combination, a hopper having an exit passage, two cranks connected to the hopper and movable about parallel axes, and driving mechanism for rotating said cranks to effect delivery of articles through said passage.

4. Article transferring mechanism having, in combination, a hopper having an exit passage, a crank rotating in a substantially horizontal plane and connected to the hopper, and driving mechanism for rotating said crank in one direction only to effect delivery of articles through said passage.

5. Article transferring mechanism having, in combination, a hopper having an exit passage, mechanism for moving the hopper, a stationary support adjacent to said passage, and a spring at each side of said passage and connected at its opposite ends to the hopper and to the support to provide a guideway for articles delivered through said passage.

6. Article transferring mechanism having, in combination, a hopper arranged with its bottom inclined to the horizontal and having an exit passage in its lower wall, two separated, low cross-ribs on said bottom extending from the opposite side walls and with their ends overlapping a line extending downward along the bottom to said passage, partitions across the two lower corners of the hopper, a stationary finger extending to a point above the said bottom and between said ribs and said passage, and means for moving said hopper to effect delivery of articles through said passage.

7. Article transferring mechanism having, in combination, a hopper arranged with its bottom inclined to the horizontal and having an exit passage in one side wall and two cross-ribs on said bottom with their ends overlapping a line extending downward along the bottom to said passage, and means for moving said hopper to effect delivery of articles through said passage.

8. Article transferring mechanism having, in combination, a hopper having an exit passage and having its bottom inclined to the horizontal, a normally stationary raceway, means for moving the hopper to effect delivery of articles through said passage to said raceway, and means having provision for adjustment to vary the angle of inclination of said bottom while maintaining operative relation between said hopper and said raceway.

9. Article transferring mechanism having, in combination, a hopper having walls forming an exit passage, means for moving the hopper, a stationary raceway, a lever mounted on the raceway, a gate mounted on the lever between said walls with provision for movement of the gate toward and from the fulcrum of the lever and also laterally to accommodate relative movement between the hopper and the raceway, and means controlled by an article moving along the raceway for moving the lever to bring the gate into the path of said articles.

10. Article transferring mechanism having, in combination, a hopper having walls forming an exit passage, a raceway, a gate mounted on the raceway and movable between said walls, a finger extending into the raceway, connections including yielding means between said finger and said gate constructed and arranged to move the gate to close said passage while an article is passing along the raceway past the finger, and means for moving the hopper relatively to the raceway to effect the delivery of articles from the hopper through said passage.

11. Article transferring mechanism having, in combination, a hopper having an exit passage, a lever, a finger at one end of the lever, a stop at the other end of the lever, the finger and stop being movable alternately into and out of the path of articles delivered through said passage, and means for so supporting the lever that the finger is normally in said path and so that articles passing the finger move the lever to carry the stop into said path.

12. Article transferring mechanism having, in combination, a hopper having an exit passage, a gate for said passage, a raceway, a finger extending into the raceway, and connections between said finger and said gate constructed and arranged to move the gate to close said passage while an article is passing along the raceway past the finger.

13. Article transferring mechanism having, in combination, a hopper having an exit passage, means for moving the hopper, a stationary raceway, a yielding guideway between said passage and said raceway, a movable finger arranged in one position to engage articles in the raceway, and a stop movable by said finger into the path of said articles for interrupting the delivery of articles to the raceway.

14. Article transferring mechanism having, in combination, a hopper having an exit passage, a raceway, a movable finger arranged in one position to engage articles in the raceway, and a stop movable by said finger into the path of said articles for interrupting the delivery of articles to the raceway.

15. Article transferring mechanism having, in combination, a table, a picker having at its lower end a rigid part to engage an article resting on the table and two spring fingers adapted to clamp the article against said part, a carrier arm in which the picker is mounted, an ejector movable axially in the picker, a lever pivoted on said arm and connected to the ejector, a spring tending constantly to move said lever in one direction, a rod connected to said lever and arranged to come into engagement with the table at one point in the cycle of operations to move said lever in the opposite direction, a latch for said lever, a spring tending to move the latch in one direction and a rod connected to the latch and arranged to come into engagement with the table at another point in the cycle of operations to release the latch, a supporting rod for said carrier arm and automatic mechanism including two cams and connections to said supporting rod for moving the rod both axially and rotatively to cause the picker to grasp an article upon said table, lift it from said table, transfer it laterally, and then deposit it in a new position.

16. Article transferring mechanism having, in combination, a table, a picker having at its lower end a rigid part to engage an article resting on the table and two spring fingers adapted to clamp the article against said part, a carrier arm in which the picker is mounted, an ejector movable axially in the picker, a lever pivoted on said arm and connected to the ejector, a spring tending constantly to move said lever in one direction, a latch for said lever pivoted to said arm, a supporting rod for said arm, and automatic mechanism including two cams and connections to said rod for moving the rod both axially and rotatively to cause the picker to grasp an article upon said table, lift it from said table, transfer it laterally, and then deposit it in a new position.

17. Article transferring mechanism having, in combination, a picker, a carrier arm in which the picker is mounted, an ejector, a lever mounted on said arm and connected to the ejector, a spring tending constantly to move said lever in one direction, a latch for said lever, mechanism for moving the carrier arm in two directions, and means rendered operative by the movement of the carrier successively to move said lever relatively to the carrier and to release said latch.

18. Article transferring mechanism having, in combination, a picker, a carrier arm for said picker, an ejector, a lever movably mounted on said arm and connected to the ejector, mechanism for moving the carrier arm to and fro in each of two directions, and means controlled by such movement for relatively moving said arm and said lever to effect ejecting and retracting movements of the ejector.

19. Article transferring mechanism having, in combination, a support for articles, a picker, a carrier arm for said picker, and automatic mechanism including two cams and connections to said carrier arm respectively for raising and lowering and for oscillating said arm to cause the picker to grasp an article upon said support, lift it from said support, transfer it laterally, deposit it in a new position, and then return by substantially the same path to its original position.

20. In article transferring mechanism, the combination of a plunger having a rigid part to engage an article and two spring fingers with outturned ends adapted to pick up and clamp the article laterally against said part.

21. Article transferring mechanism having, in combination, a table for supporting articles, a picker having article clamping means at its lower end, an ejector, a carrier arm for said picker and automatic mechanism including two cams and connections to said carrier arm for moving said arm in both directions along a path corresponding approximately in shape to an inverted U to cause the picker to grasp an article resting on said table, lift it from the table, transfer it laterally and deposit it in a new position.

22. Article transferring mechanism having, in combination, a hopper having an exit passage, a bodily-movable pin on which said hopper is journaled, a crank, a crank pin thereon pivotally connected to the hopper, and driving mechanism for rotating said crank continuously to effect delivery of articles through said passage.

IRA C. BUCKMINSTER.